United States Patent
Tas

(10) Patent No.: US 11,767,264 B2
(45) Date of Patent: Sep. 26, 2023

(54) MINERAL ADDITIVES AND PRODUCTION OF LIGHTWEIGHT COMPOSITE MATERIALS FROM CARBONATABLE CALCIUM SILICATE

(71) Applicant: Solidia Technologies, Inc., Piscataway, NJ (US)

(72) Inventor: Ahmet Cuneyt Tas, Piscataway, NJ (US)

(73) Assignee: SOLIDIA TECHNOLOGIES, INC., San Antonio, TX (US)

(*) Notice: Subject to any disclaimer, the term of this patent is extended or adjusted under 35 U.S.C. 154(b) by 804 days.

(21) Appl. No.: 15/933,011

(22) Filed: Mar. 22, 2018

(65) Prior Publication Data

US 2021/0017081 A1    Jan. 21, 2021

Related U.S. Application Data

(60) Provisional application No. 62/475,403, filed on Mar. 23, 2017.

(51) Int. Cl.
| | | |
|---|---|---|
| *C04B 28/10* | (2006.01) | |
| *B28B 1/50* | (2006.01) | |
| *B28B 11/24* | (2006.01) | |
| *C04B 28/18* | (2006.01) | |
| *C04B 38/00* | (2006.01) | |
| *C04B 38/02* | (2006.01) | |
| *C04B 40/02* | (2006.01) | |

(52) U.S. Cl.
CPC ............ *C04B 28/105* (2013.01); *B28B 1/503* (2013.01); *B28B 11/245* (2013.01); *C04B 28/188* (2013.01); *C04B 38/0058* (2013.01); *C04B 38/02* (2013.01); *C04B 40/0231* (2013.01)

(58) Field of Classification Search
CPC .............. B28B 11/245; C04B 40/0231; C04B 28/18–188; C04B 28/10–105; C04B 2/00–12/04
See application file for complete search history.

(56) References Cited

U.S. PATENT DOCUMENTS

| | | | |
|---|---|---|---|
| 2011/0017101 A1* | 1/2011 | Nguyen ................ | C04B 18/142 106/482 |
| 2015/0056437 A1 | 2/2015 | Deo et al. | |
| 2015/0266778 A1* | 9/2015 | Riman ................. | B28B 11/245 106/286.6 |

(Continued)

FOREIGN PATENT DOCUMENTS

| | | |
|---|---|---|
| CN | 105294154 A | 2/2016 |
| CN | 106457604 A | 2/2017 |

(Continued)

*Primary Examiner* — Erin Snelting
(74) *Attorney, Agent, or Firm* — BRYAN CAVE LEIGHTON PAISNER LLP

(57) ABSTRACT

The invention provides novel aerated composite materials made from a carbonatable calcium silicate composition, and formulations and methods of manufacture and use thereof, in particular, the use of novel additive mineral compositions in the form of magnesium, magnesium salts or magnesium oxides, to improve physical chemical properties of low density concrete materials. The low density, aerated material is comprised of calcium carbonate ($CaCO_3$) and silica ($SiO_2$), as cured products of carbonatable calcium silicate compositions.

14 Claims, 7 Drawing Sheets

(56) References Cited

U.S. PATENT DOCUMENTS

2016/0031757 A1    2/2016   Atakan et al.
2016/0340261 A1   11/2016   Atakan et al.

FOREIGN PATENT DOCUMENTS

| | | |
|---|---|---|
| JP | 03228880 A | 10/1991 |
| JP | 2001097784 A | 4/2001 |
| JP | 2016519038 A | 6/2016 |
| JP | 2016531077 A | 10/2016 |
| WO | 2014/159832 A1 | 10/2014 |
| WO | 2015026900 A2 | 2/2015 |
| WO | 2016/022485 A1 | 2/2016 |
| WO | 2016/187178 A1 | 11/2016 |

* cited by examiner

MINERAL ADDITIVES AND PRODUCTION OF LIGHTWEIGHT COMPOSITE MATERIALS FROM CARBONATABLE CALCIUM SILICATE

PRIORITY CLAIMS AND RELATED PATENT APPLICATIONS

This application claims the benefit of priority to U.S. Provisional Application Ser. No. 62/475,403, filed on Mar. 23, 2017, the entire content of which is incorporated herein by reference.

FIELD OF THE INVENTION

The invention generally relates to aerated composite materials and processes for production of the same. More particularly, the present invention relates to a novel aerated composite material made from a carbonatable calcium silicate composition, and formulations and methods of manufacture and use thereof, in particular, the use of novel additive mineral compositions to improve properties of lightweight concrete materials, such as durability and strength. The aerated composite material of the invention is comprised of calcium carbonate ($CaCO_3$) and silica ($SiO_2$), as cured products of carbonatable calcium silicate compositions.

BACKGROUND OF THE INVENTION

In general, autoclaved aerated concrete ("ordinary AAC") is one example of lightweight precast concrete that is formed under a high temperature and high pressure (for example, 190° C., 12 atm) cured for 6 to 8 hours using raw materials such as calcareous materials of cement and lime (CaO), siliceous materials such as silica ($SiO_2$), silica sand ($SiO_2$), and other materials such as gypsum ($CaSO_4 \cdot 2H_2O$), recycled materials produced in manufacturing such as fly ash, metal aluminum and other aerating agents, surfactants for stabilizing the bubbles, and other fillers. The aerating agent causes gas voids to form in the matrix and increases the porosity of the material. This causes an increase in the volume and thereby reduces the density of the material.

Despite their overarching benefits, ordinary AAC are prepared by processes that commonly suffer from a number of deficiencies. The manufacturing process of ordinary AAC involves special equipment, large energy consumption, and excessive carbon dioxide emission, leaving unfavorable carbon footprint. Ordinary AAC are typically cured in autoclaves at temperatures ranging from 150° C. to 190° C. and at pressures ranging from 0.8 MPa to 1.2 MPa. These conditions lead to the creation of tobermorite, which is the primary bonding element in ordinary AAC. In addition, they are relatively expensive due to high finishing costs and are also difficult to recycle.

Ordinary AAC also consists of a large number of pores and bubbles that can simultaneously hold some amount of water. This water is found to be present even when the ordinary AAC is in a usual usage environment. Since ordinary AAC have a large number of air bubbles inside them, carbon dioxide from the air can infiltrate inside the ordinary AAC over time to initiate the decomposition of tobermorite bonding element. The infiltrated carbon dioxide can also dissolve into such water, where calcium derived from various components is also present.

Further, the water present in the ordinary AAC also helps in the reaction between calcium and carbon dioxide to form calcium carbonate as a precipitate. This is generally referred to as "carbonation". This carbonation phenomenon usually occurs in conventional concrete materials. As a result of carbonation, the concrete structure becomes dense and its strength increases, while its water adsorption falls. Other phenomena simultaneously occur, for example, shrinkage of the structure (matrix), formation of micro-cracks, and drop in strength due to rusting of the iron reinforcement accompanying neutralization. Similar phenomena can arise with ordinary AAC. In ordinary AAC, when such carbonation proceeds excessively over a long period of time, the above-mentioned shrinkage of the matrix can cause problems accompanying carbonation in the same way as in the case in conventional concrete materials. Excessive carbonation can become a serious problem.

Recently, a revolutionary form of cement that is based on carbonatable calcium silicate materials has emerged as a promising substitute to traditional cements. Production of carbonatable calcium silicate-based cements involves significantly reduced $CO_2$ emissions and energy consumption. In addition, this new cement sequesters $CO_2$ when cured into concrete products because $CO_2$ is needed to react with the carbonatable calcium silicate materials during the curing process to form concrete products.

To avoid in principle the problems such as carbonation in concretes and ordinary AAC, WO2012/122031A and U.S. Pat. No. 9,868,667 B2 disclose an improved bonding matrix in place of conventional cement, concrete, or other ceramic material such as $CaO \cdot 2SiO_2 \cdot 4H_2O$ and $CaO \cdot H_2O$ or other weak hydrated Portland cement. The bonding element of such a bonding matrix is, for example, comprised of a precursor particle comprised of calcium silicate ($CaSiO_3$).

More particularly, the bonding element is already sufficiently carbonated at the time of production, so at least the problems of carbonation that occur along with the elapse of time in the concretes and ordinary AAC of the prior art, are avoided. This bonding element can be formed by the method of gas-assisted hydrothermal liquid phase sintering.

In addition, WO2014/165252A discloses a carbonation-cured material constituted by an aerated composite material using a carbonatable calcium silicate composition and a process of production of the same. WO2014/165252A describes an aerated composite material made from calcium silicate compositions where a plurality of voids comprise bubble-shaped and/or interconnected channels account for 50 vol % to 80 vol % of the composite material and where the composite material exhibits a density of approximately 300 kg/m³ to 1500 kg/m³, exhibits a compressive strength of approximately 2.0 MPa to approximately 8.5 MPa (N/mm²), and exhibits a flexural strength of approximately 0.4 MPa to approximately 1.7 MPa.

In an aerated composite material made from a carbonatable calcium silicate composition, the high temperature, high-pressure atmosphere in ordinary AAC is not required and autoclaving becomes unnecessary. It becomes possible to significantly lower the temperature at the time of curing. That is, in an aerated composite material using a carbonatable calcium silicate composition, carbonation is utilized for the curing itself, so the carbonation after production can be greatly reduced and the occurrence of problems in case of ordinary AAC associated with excessive carbonation can be fundamentally eliminated.

Furthermore, WO2016/187178 discloses an aerated composite material produced from a carbonatable calcium silicate composition that has a compressive strength equivalent to ordinary AAC at substantially the same density. WO2016/187178 discloses that of the pores having radius from 0.004

μm to 10.0 μm are mostly saturated by water before carbonation. As the carbonatable calcium silicate composition undergoes carbonation, these pores are effectively filled by precipitation of calcium carbonate. The pores in the bubble volume having radius 10.0 μm or more are not saturated by water before carbonation, so at these bubbles the calcium carbonate precipitates only inside the adsorbed water layer. The bubble volume can also be controlled by the dosage of the foaming agent (aerating agent), e.g., metal aluminum. In addition to the control of volume of air bubbles, it is very important to control the densification of the solid part supporting the air bubbles. Effective control of the pore volume greatly affects the compressive strength.

Precast concrete is widely used in many different applications and involves the casting of concrete into reusable forms that are often cured under controlled conditions. In many applications involving aerated composite materials, aesthetic qualities are equally as important as the physical or mechanical properties of the products. As a result, much of the value for many precast lightweight concrete products is predicated on meeting stringent and often highly demanding aesthetic criteria.

Therefore, a need exists, in the field of aerated concrete production from carbonatable calcium silicate-based cements, for low cost materials and reliable and efficient methodologies that achieve excellent mechanical and durability properties accompanied by high aesthetic qualities in lightweight concrete products.

SUMMARY OF THE INVENTION

The invention provides novel methods and compositions for improving the physical properties (e.g., mechanical and durability properties) of aerated concrete products made from carbonatable calcium silicate-based cements (also referred as "Solidia Cement") comprising of ground calcium silicate particles.

The process of aerated (sometimes referred as "lightweight") concrete production disclosed herein involves using specially selected mineral additives, typically magnesium oxide in coarse, fine, and ultra-fine particulate or powdery forms or water-soluble magnesium salts, such as, magnesium chloride, magnesium nitrate, magnesium sulphate or magnesium acetate, to improve the properties of aerated concrete products, especially in various precast applications.

For example, magnesium acetate powder is used to improve the strength of concrete products manufactured from carbonatable calcium silicate-based cements through induced crystal morphologies such as aragonite in place of calcite. Fine magnesium oxide may also be employed in an accelerated carbonation curing process to stabilize calcium carbonate polymorphs such as Mg-calcite (magnesian), aragonite and dolomite and improve the physical properties of calcium silicate-based binders.

In one aspect, the invention generally relates to a process of production of an aerated composite material. The process includes: forming a wet mixture or slurry, wherein the slurry comprises water, filler particles comprising CaO having a particle size of 0.1 μm to 1000 μm, ground calcium silicate particles, one or more minerals comprising magnesium acetate or magnesium oxide, and an aerating agent has a water/solid ratio (W/S) of 1.0 or less; casting the slurry in a mold; allowing the aerating agent to generate hydrogen gas thereby causing volume expansion (or foaming) of the slurry; pre-curing the obtained expanded mixture to a hardness enabling it to be taken out from the mold and moved; wire-cutting the obtained pre-cured expanded mixture into a desired product shape; and causing the wire-cut expanded mixture to cure at ordinary pressure, 20° C. or more of temperature, a relative humidity of 1% to 90%, preferably 5 to 50%, more preferably 5 to 30%, in an atmosphere of $CO_2$ gas concentration from 5% to 95% for about 6 hours to about 60 hours.

In certain embodiments, magnesium acetate in the one or more minerals accounts for about 0.02% to about 10% by weight of the ground calcium silicate particles.

In certain embodiments, magnesium oxide in the one or more minerals accounts for about 0.02% to about 20% (e.g., from about 0.1% to about 20%, from about 0.5% to about 20%, from about 1% to about 20%, from about 5% to about 20%, from about 0.02% to about 10%, from about 0.02% to about 5%, from about 0.02% to about 1%, from about 0.02% to about 0.1%), by weight of the ground calcium silicate particles.

In another aspect, the invention generally relates to an aerated concrete product produced by a process disclosed herein.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 1A: Low magnification image depicting the porous character of the sample. FIG. 1B: High magnification image; sample contained dolomite and aragonite as the major carbonation phases, calcite being the minor carbonation phase.

FIG. 2A: Low magnification image showing the bubble structure with smooth and dense surfaces, dense bubble surfaces help to develop strength. FIG. 2B: High magnification image showing the growth of interlocked aragonite whiskers in the pore struts, which also help to develop strength.

FIG. 4A: Bubbles at low magnification. FIG. 4B: aragonite whiskers (or needles) crystallizing out of the bubble surfaces, the interlocking or intermingling of these whiskers help to develop strength.

DETAILED DESCRIPTION OF THE INVENTION

Figure 1A:
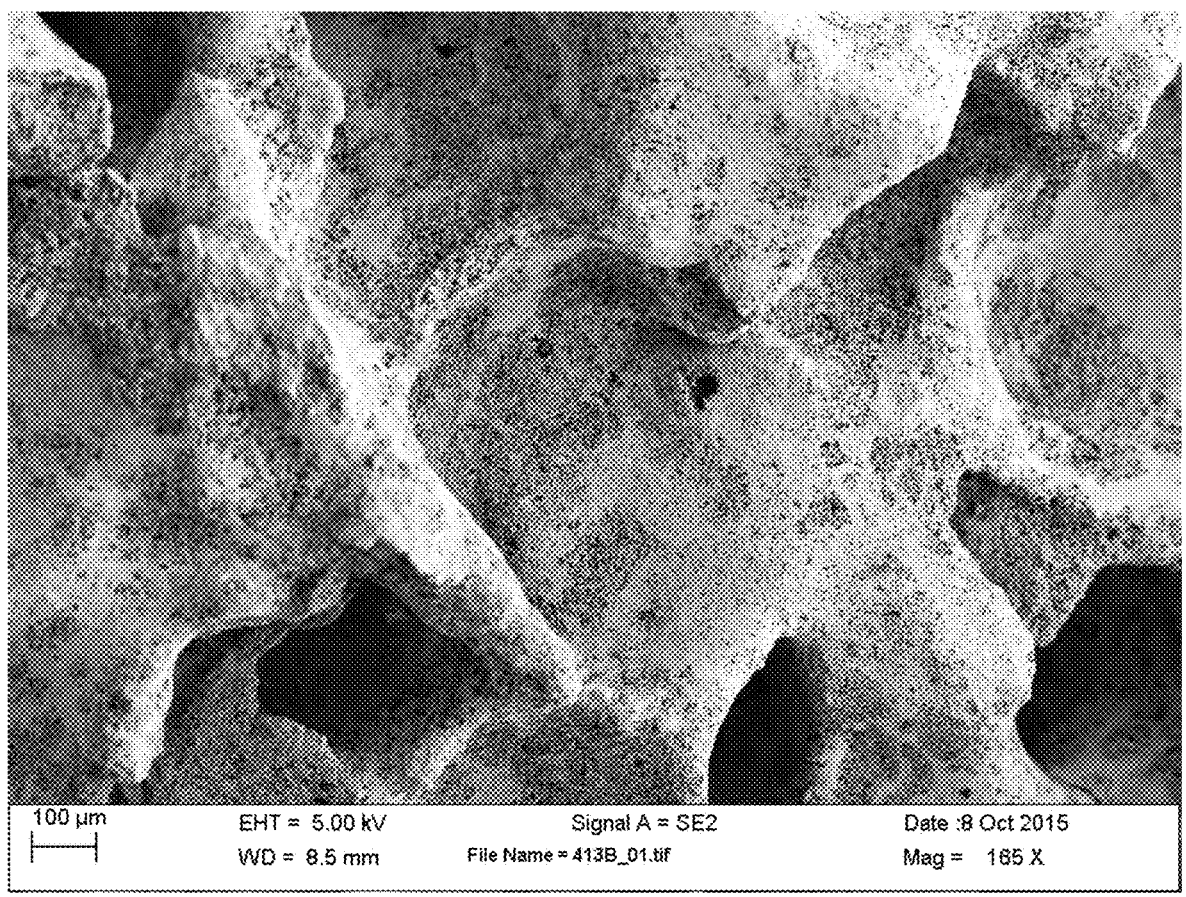
FIGS. 1A-1B Scanning electron microscope (SEM) images of $CO_2$-cured Solidia aerated which contained both MgO (7.5 wt % of solids) and magnesium acetate (0.4 wt % of solids) additives to the Solidia cement-based slurry.
Figure 1B:
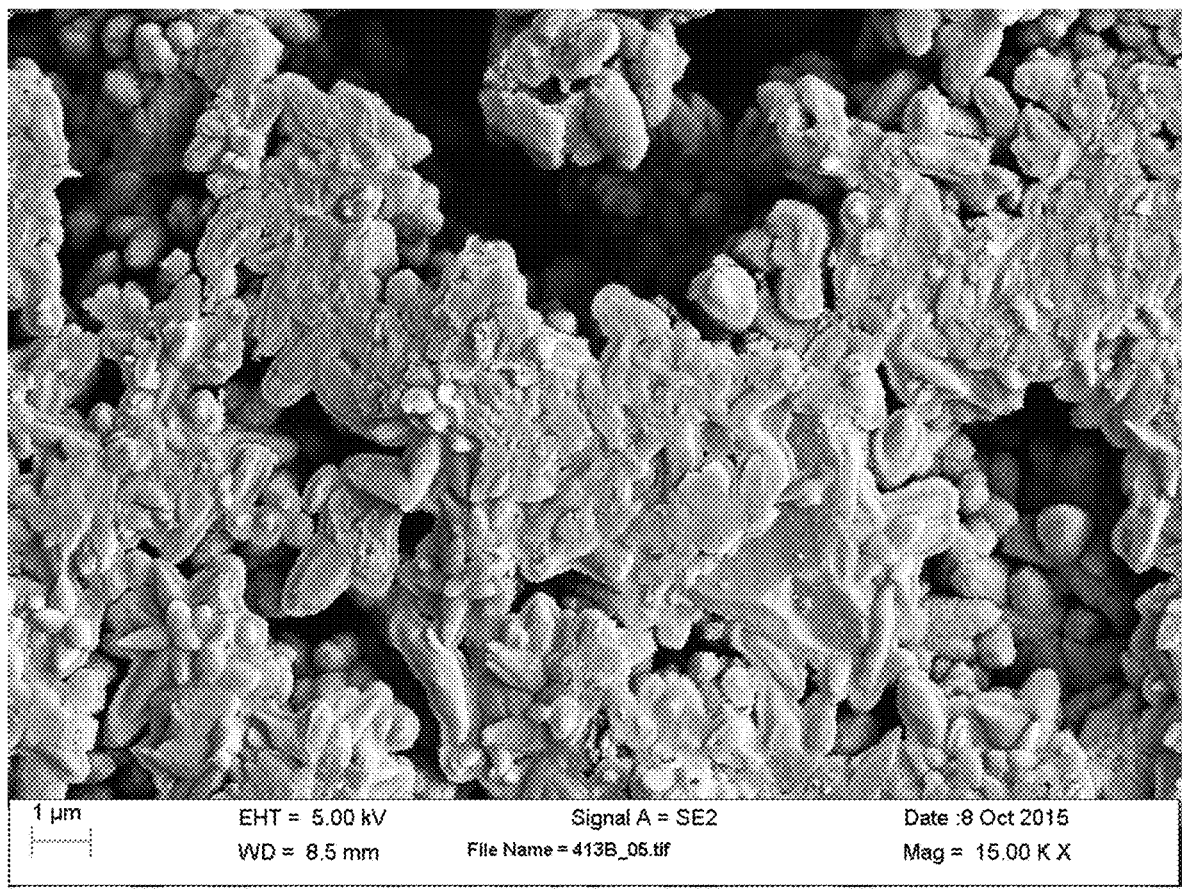
Figure 2A:
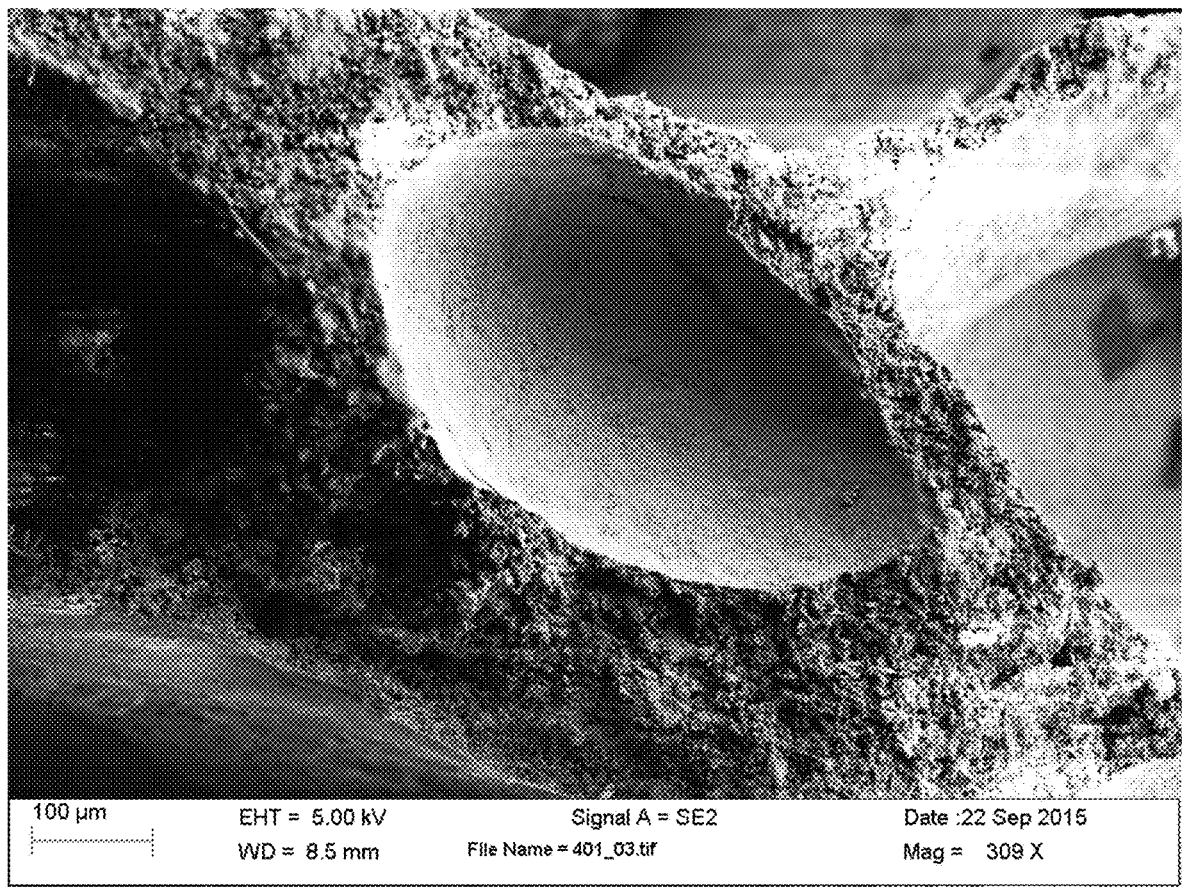
FIGS. 2A-2B SEM images of Mg-acetate-containing (5.7 wt % of solids) $CO_2$-cured Solidia aerated.
Figure 2B:
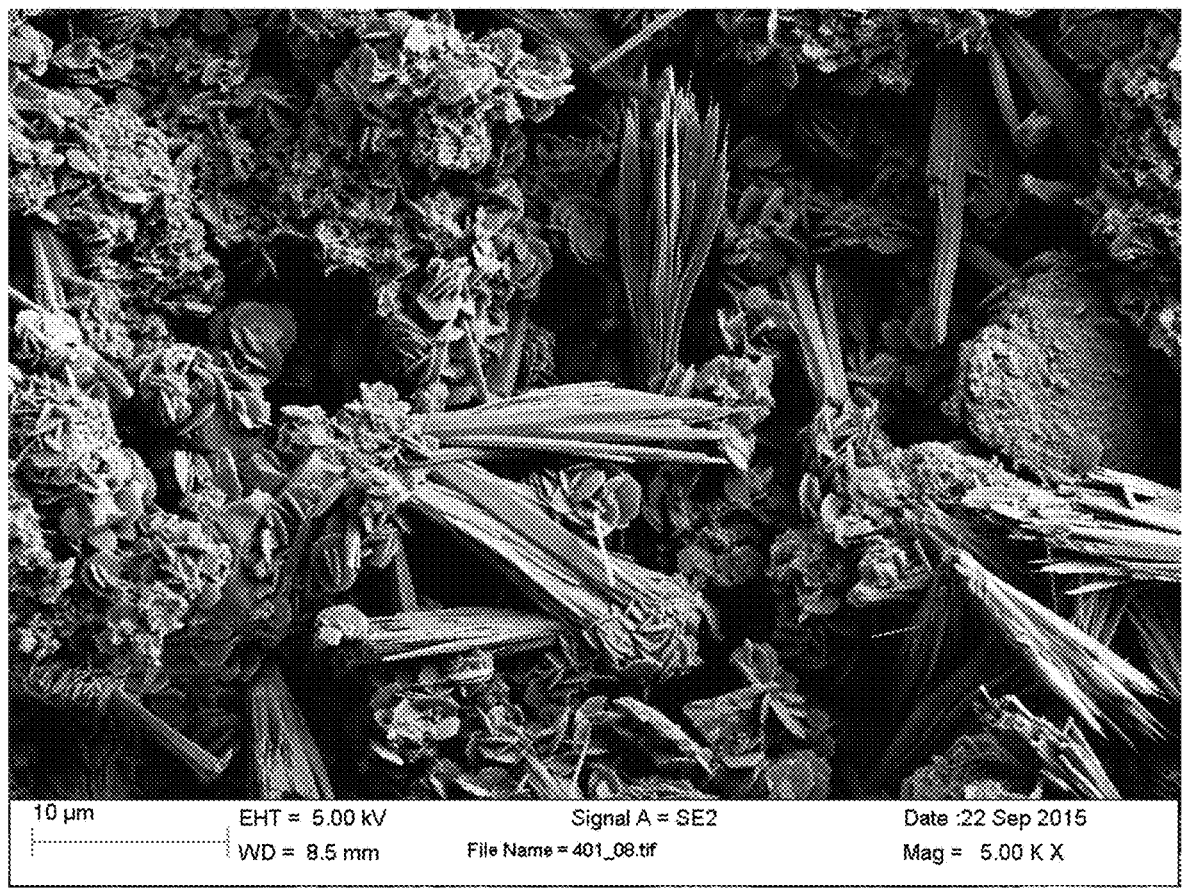
Figure 3:
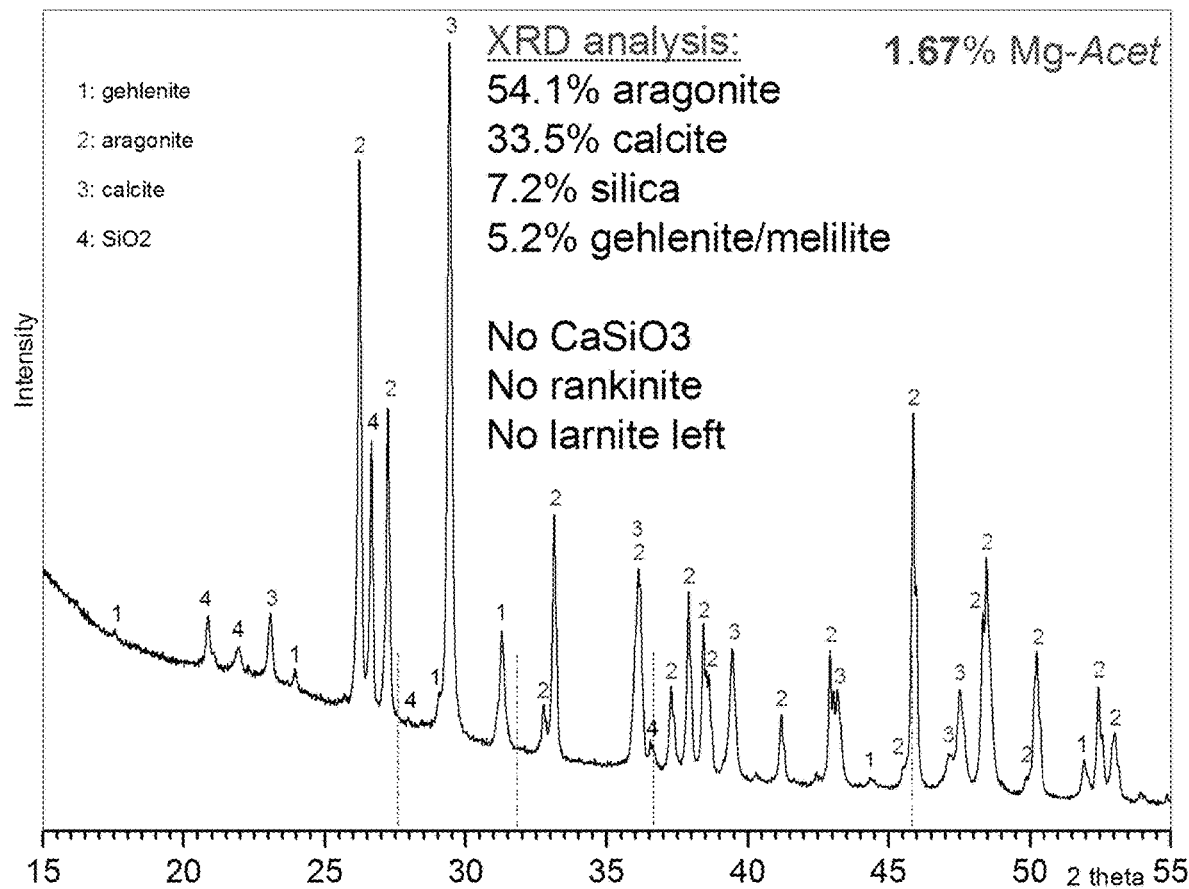
FIG. 3. X-ray diffraction (XRD) data of a $CO_2$-cured Solidia aerated sample that contained 1.67 wt % (of solids) magnesium acetate as the slurry additive; the major phase is aragonite and no unreacted wollastonite, rankinite and larnite remained in the sample.
Figure 4A:
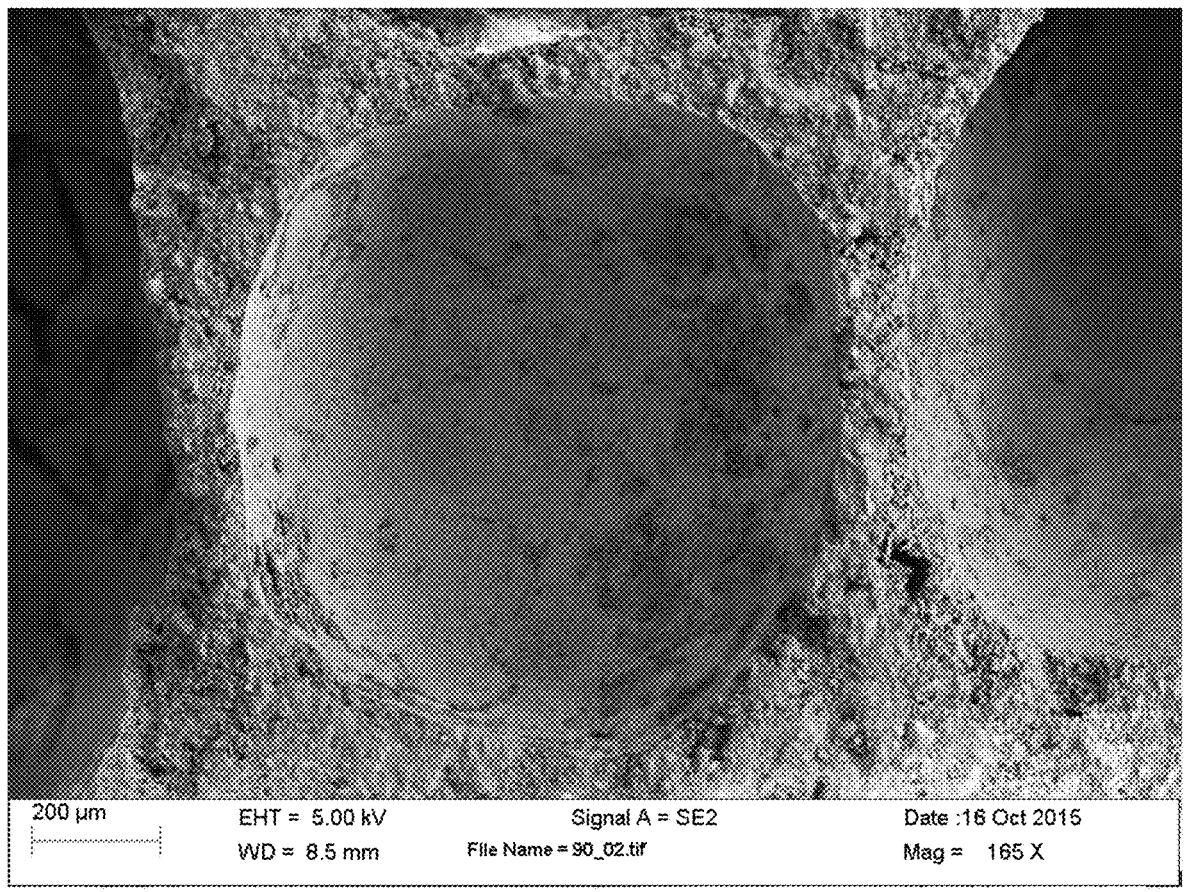
FIGS. 4A-4B SEM photomicrographs of a $CO_2$-cured Solidia aerated sample containing 4.5 wt % (of solids) Mg-acetate slurry additive.
Figure 4B:
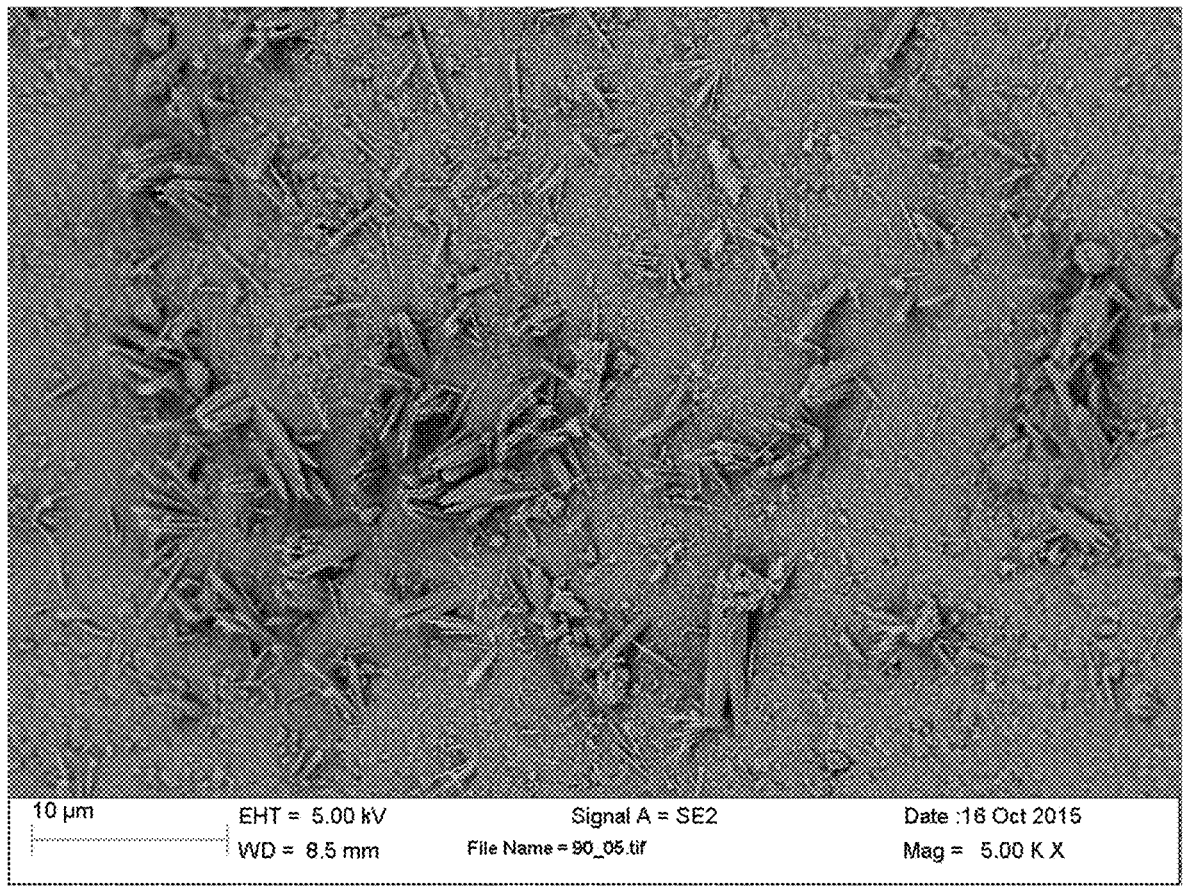

The invention provides a novel approach to improving the physical properties of lightweight or low-density concrete products, such as aerated concrete products, made from carbonatable calcium silicate-based cements comprising of ground calcium silicate particles.

The process of aerated concrete production disclosed herein involves using specially selected mineral additives, typically magnesium acetate, magnesium nitrate, magnesium sulphate, magnesium chloride and/or magnesium oxide in powdery forms, to improve the properties of aerated concrete products.

Herein, exemplary embodiments of the present invention are explained in detail.

Carbonatable calcium silicate-based cements and concretes are a revolutionary replacement for conventional cement and concrete products. These materials can be produced and utilized with significantly reduced energy requirement and $CO_2$ emissions. The carbonatable calcium silicate compositions are made from widely available, low cost raw materials by a process suitable for large-scale production with flexible equipment and production requirements. This unique approach is accompanied by a remarkable proficiency for permanently and safely sequestering $CO_2$. A wide variety of applications can benefit from the invention through improved energy consumption and more desirable carbon footprint, from construction, pavements and landscaping, to infrastructure and transportation.

Particular use of the invention involves calcium silicate-based cements that generate strength through carbonation reaction processes wherein carbon dioxide is sequestered in the presence of water. While water is necessary for certain provisions such as dispersion and forming, it is not a primary component of the final reaction products.

Furthermore, it has been discovered that the addition of certain mineral compositions (e.g., magnesium acetate, magnesium sulphate, magnesium nitrate, magnesium chloride or magnesium oxide) to a concrete mix can also significantly improve mechanical properties and durability of an aerated product.

Without wishing to be bound by the theory, strength generation during carbonation of calcium silicate particles, which do not have the hydraulic mineral hatrurite (C3S) and which possess a Ca/Si molar ratio much lower than that of ordinary Portland cement, proceeds in two steps: (i) the formation of an X-ray-amorphous layer of silicate-rich (or Ca-deficient) gel, through which the $Ca^{2+}$ must diffuse out to the external surface that is in contact with the $CO_2(g)$, on the ground calcium silicate particles, and (ii) the formation of individual $CaCO_3$ crystals on that X-ray-amorphous gel layer and the further evolution of such individual $CaCO_3$ crystals into a 3D interconnected, intermingling network of $CaCO_3$.

The intentional addition of an alkali earth cation with an ionic radius smaller than that of $Ca^{2+}$ (114 pm), such as $Mg^{2+}$ (86 pm), was found, as disclosed herein, to be effective in decreasing the amount of unreacted calcium silicate remaining at the end of carbonation, which resulted in noticeable strength increases. $Mg^{2+}$ is able to diffuse greater distances throughout the very first $CO_2$-curing (i.e., weathering) product (which is Ca-deficient, X-ray-amorphous silicate-based gel layer) forming on the calcium silicate-based cement particles. $Mg^{2+}$ ions can be originating from one or more of the following; magnesium, magnesium acetate, magnesium oxide, magnesium sulphate, magnesium nitrate or magnesium chloride.

The added magnesium, magnesium oxide or water-soluble magnesium salt to the liquid or slurry portion of a concrete mix, is then able to in situ carbonate itself, during $CO_2$ curing, to one or more of aragonite ($CaCO_3$), Mg-calcite (magnesian), magnesite ($MgCO_3$), dolomite ($CaMg(CO_3)_2$), hydromagnesite ($Mg_5(CO_3)_4(OH)_2 \cdot 4H_2O$), nesquehonite ($Mg(HCO_3)(OH) \cdot 2H_2O$ or $MgCO_3 \cdot 3H_2O$), dypingite ($Mg_5(CO_3)_4(OH)_2 \cdot 5H_2O$), artinite ($Mg_2CO_3(OH)_2 \cdot 3H_2O$), barringtonite ($MgCO_3 \cdot 2H_2O$), or lansfordite ($MgCO_3 \cdot 5H_2O$). The formation of such hydrated phases results in the in situ water removal from their immediate surroundings. These basic (i.e., with intrinsic pH values above neutral) phases usually crystallize in acicular or needle forms and the interlocking/intermingling of these needles with one another further helps to increase the strength in the products. The formation of such needles or whisker-like crystals of the calcium carbonate, magnesium carbonates, calcium magnesium carbonates, magnesium hydroxycarbonates and/or hydrated magnesium carbonates, can positively alter the nature and extent of strength generation and preservation.

The small presence of acetate ions and/or acetic acid in the forming waters of concrete and mortar batches were also shown to increase the mean strength in the calcium silicate-based samples upon carbonation.

In stark contrast to the $CaO$—$CO_2$—$H_2O$ system, the $MgO$—$CO_2$—$H_2O$ ternary diagram presents a number of hydrated and carbonated phases (e.g., magnesite, hydromagnesite, nesquehonite, dypingite, barringtonite, protohydromagnesite, artinite and lansfordite).

The addition of water-soluble magnesium salts, or magnesium or magnesium oxide powders, in different grades of particle size distribution(s) and reactivity, to the wet batches of paste, mortar and concrete samples was found to help generate strength upon carbonation in moist atmospheres by forming crystals of one or more of the above-mentioned phases of the $MgO$—$CO_2$—$H_2O$ system. The addition of a small amount of water soluble salt of magnesium acetate ($Mg(CH_3COO)_2 \cdot 4H_2O$) or a solution of controlled pH value formed by dissolving a prescribed quantity of MgO powder in a prescribed volume of dilute acetic acid into the forming water of paste, mortar or concrete samples resulted in a noticeable strength increase upon carbonation.

Magnesium, when present even in low concentrations (<1%), was demonstrated to be a strong aragonite promoter when present in aqueous systems prone to nucleate $CaCO_3$, regardless of the processing temperature.

In one aspect, the invention generally relates to a process of production of an aerated composite material. The process includes: forming a slurry, wherein the slurry comprises water, ground calcium silicate particles, filler particles comprising CaO having a size of a particle size of 0.1 μm to 1000 μm, one or more minerals comprising magnesium salt and/or magnesium oxide, and an aerating agent has a water/solid ratio (W/S) of 1.0 or less; casting the slurry in a rigid mold; allowing the aerating agent to generate hydrogen gas thereby causing volume expansion of the slurry; pre-curing the obtained expanded mixture to a hardness enabling it to be taken out from the mold and moved; wire-cutting the obtained pre-cured expanded mixture into a desired product shape; and causing the cut expanded mixture to cure at ordinary pressure, 30° C. or more of temperature, a relative humidity of about 1% to about 90% (e.g., about 5% to about 90%, about 10% to about 90%, about 20% to about 90%, about 30% to about 90%, about 50% to about 90%, about 60% to about 90%, about 1% to about 80%, about 1% to about 70%, about 1% to about 60%, about 1% to about 50%, about 1% to about 40%, about 1% to about 30%) or more, and an atmosphere of a $CO_2$ gas concentration of about 10% to about 95% (e.g., about 20% to about 95%, about 30% to about 95%, about 40% to about 95%, about 50% to about 95%, about 10% to about 85%, about 10% to about 75%, about 10% to about 60%, about 10% to about 50%, about 10% to about 30%) for about 6 hours to about 60 hours (e.g., about 12 hours to about 60 hours, about 24 hours to about 60 hours, about 36 hours to about 60 hours, about 6 hours to about 48 hours, about 6 hours to about 36 hours, about 6 hours to about 24 hours, about 6 hours to about 12 hours).

In certain embodiments, magnesium acetate in the one or more minerals accounts for about 0.02% to about 10% (e.g., about 0.05% to about 2.5%, about 0.05% to about 2.0%, about 0.05% to about 1.5%, about 0.05% to about 1%, about 0.05% to about 0.5%, about 0.05% to about 0.1%, about 0.1% to about 3%, about 0.5% to about 10%, about 1% to about 10%, about 1.5% to about 10%, about 0.5% to about 2%, about 0.2% to about 1%) by weight of the ground calcium silicate particles.

In certain embodiments of the invention, magnesium, magnesium salt or magnesium oxide are added so that magnesium ions in solution can improve the reactivity of calcium-bearing silicate phases through modification of silicate networks containing calcium.

In certain embodiments of the invention, magnesium, magnesium salt or magnesium oxide at small percentages is added to carbonatable calcium silicate-based cement mixtures to promote the formation of Mg-calcite phases, such as magnesian.

In certain embodiments of the invention, magnesium, or water-soluble magnesium salt or magnesium oxide is added to carbonatable calcium silicate-based cement mixtures to promote the formation of acicular calcium carbonate phases, such as aragonite.

In certain embodiments of the invention, magnesium, magnesium salt or magnesium oxide is added to carbonatable calcium silicate-based cement mixtures to promote the formation of dolomite.

In certain embodiments of the invention, magnesium, magnesium salt or magnesium oxide is added to carbonatable calcium silicate-based cement mixtures to stabilize Mg-calcite and/or aragonite and to alter the phase percentage of vaterite.

In certain embodiments of the invention, magnesium, magnesium salt or magnesium oxide is added to carbonatable calcium silicate-based cement mixtures to increase the degree of carbonation and sequestration of carbon dioxide.

In certain embodiments, the ground calcium silicate particles comprise one or more of a group of calcium silicate phases selected from CS (wollastonite or pseudowollastonite), C3S2 (rankinite), C2S (belite, larnite, bredigite), an amorphous calcium silicate phase, each of which material optionally comprises one or more metal ions or oxides, or blends thereof.

In certain embodiments, in the carbonatable calcium silicate-based cement elemental Ca and elemental Si are present in the composition at a molar ratio from about 0.5 to about 1.5 and metal oxides of Al, Fe and Mg are present in the composition at about 30% or less by mass.

In certain embodiments, the temperature at the carbonation step is in a range from about 25° C. to about 90° C. (e.g., from about 25° C. to about 80° C., from about 25° C. to about 70° C., from about 25° C. to about 60° C., from about 25° C. to about 50° C., from about 25° C. to about 40° C., from about 30° C. to about 90° C., from about 40° C. to about 90° C., from about 50° C. to about 90° C., from about 60° C. to about 90° C., from about 70° C. to about 90° C.).

In certain embodiments, the relative humidity at the carbonation step is about 10% or more (e.g., about 10% to about 90%, about 10% to about 70%, about 10% to about 50%, about 10% to about 30%).

In certain embodiments, the time at the carbonation step is 6 hours or more (e.g., 10 hours, 20 hours, 50 hours, 60 hours, 70 hours, 80 hours or more).

In certain embodiments, the process further includes adjusting the pH of the concrete mixture from about 9 to about 12 (e.g., from about 9 to about 11.5, from about 9 to about 11, from about 9 to about 10.5, from about 9 to about 10, from about 9.5 to about 12, from about 10 to about 12, from about 10.5 to about 12, from about 11 to about 12, from about 9.5 to about 11.5) prior to casting the slurry in a mold.

In certain embodiments, the one or more minerals further comprise one or more of magnesium, magnesium nitrate, magnesium sulphate, magnesium chloride, and magnesium acetate.

In certain embodiments, the one or more minerals further comprise magnesium acetate.

In certain embodiments, the slurry further comprises a dispersant or superplasticizer.

In certain embodiments, the dispersant or superplasticizer comprises a polycarboxylate-based polymer.

In another aspect, the invention generally relates to an aerated concrete product produced by a process disclosed herein.

Exemplary aerated concrete products include blocks, panels, lintels, and concrete masonry units.

In certain preferred embodiments, the molar ratio of Ca to Si of the composition is from about 0.5 to about 1.5. In certain preferred embodiments, the molar ratio of Ca to Si of the composition is from about 0.5 to about 1.2. In certain preferred embodiments, the molar ratio of Ca to Si of the composition is from about 0.5 to about 1.15. In certain preferred embodiments, the molar ratio of Ca to Si of the composition is from about 0.8 to about 1.5. In certain preferred embodiments, the molar ratio of Ca to Si of the composition is from about 0.8 to about 1.2. In certain preferred embodiments, the molar ratio of Ca to Si of the composition is from about 0.8 to about 1.15. In certain preferred embodiments, the molar ratio of Ca to Si of the composition is from about 0.85 to about 1.15. In certain preferred embodiments, the molar ratio of Ca to Si of the composition is from about 0.90 to about 1.10. In certain preferred embodiments, the molar ratio of Ca to Si of the composition is from about 0.95 to about 1.05. In certain preferred embodiments, the molar ratio of Ca to Si of the composition is from about 0.98 to about 1.02. In certain preferred embodiments, the molar ratio of Ca to Si of the composition is from about 0.99 to about 1.01.

The metal oxides of Al, Fe and Mg contained within the calcium silicate composition are generally controlled to be less than about 30%. In certain preferred embodiments, the composition has about 20% or less of metal oxides of Al, Fe and Mg by total oxide mass. In certain preferred embodiments, the composition has about 15% or less of metal oxides of Al, Fe and Mg by total oxide mass. In certain preferred embodiments, the composition has about 12% or less of metal oxides of Al, Fe and Mg by total oxide mass. In certain preferred embodiments, the composition has about 10% or less of metal oxides of Al, Fe and Mg by total oxide mass. In certain preferred embodiments, the composition has about 5% or less of metal oxides of Al, Fe and Mg by total oxide mass.

Calcium silicate compositions may contain amorphous (non-crystalline) calcium silicate phases in addition to the crystalline phases described above. The amorphous phase may additionally incorporate Al, Fe and Mg ions and other impurity ions present in the raw materials.

The calcium silicate compositions may also include small quantities of residual CaO (lime) and $SiO_2$ (silica). The calcium silicate composition may also include small quantities of C3S (alite, $Ca_3SiO_5$) or Portland cement powder.

The C2S phase present within the calcium silicate composition may exist in any $\alpha$-$Ca_2SiO_4$, $\beta$-$Ca_2SiO_4$ or $\gamma$-$Ca_2SiO_4$ polymorph or combination thereof.

The calcium silicate compositions may also include quantities of inert phases such as melilite type minerals (melilite or gehlenite or akermanite) with the general formula (Ca, Na,K)$_2$[(Mg, $Fe^{2+}$, $Fe^{3+}$, Al, Si)$_3O_7$] and ferrite type minerals (ferrite or brown millerite or C4AF) with the general formula $Ca_2(Al,Fe^{3+})_2O_5$. In certain embodiments, the calcium silicate composition is comprised only of amorphous phases. In certain embodiments, the calcium silicate comprises only of crystalline phases. In certain embodiments, some of the calcium silicate composition exists in an amorphous phase and some exists in a crystalline phase.

In certain embodiments, the calcium silicate composition includes the reactive phases that are present at about 50% or more (e.g., about 55% or more, about 60% or more, about 65% or more, about 70% or more, about 75% or more, about 80% or more, about 85% or more, about 90% or more, about 95% or more) by mass.

In certain embodiments, the calcium silicate composition includes about 20% or less of metal oxides of Al, Fe and Mg by total oxide mass.

Any suitable calcium silicate composition may be used as a precursor for the bonding elements. As used herein, the term "calcium silicate composition" generally refers to naturally-occurring minerals or synthetic materials that are comprised of one or more of a group of calcium silicate phases including CS (wollastonite or pseudowollastonite, and sometimes formulated $CaSiO_3$ or $CaO \cdot SiO_2$), C3S2 (rankinite, and sometimes formulated as $Ca_3Si_2O_7$ or $3CaO \cdot 2SiO_2$), C2S (belite, $\beta$-$Ca_2SiO_4$ or larnite, $\beta$-$Ca_7Mg$ (SiO$_4$)$_4$ or bredigite, $\alpha$-$Ca_2SiO_4$ or $\gamma$-$Ca_2SiO_4$, and sometimes formulated as $Ca_2SiO_4$ or $2CaO \cdot SiO_2$), a calcium-silicate based amorphous phase, each of which material may include one or more other metal ions and oxides (e.g., aluminum, magnesium, iron or manganese oxides), or blends thereof, or may include an amount of magnesium silicate in naturally-occurring or synthetic form(s) ranging from trace amount (1%) to about 50% or more by weight.

It is noted that preferably the carbonatable calcium silicate compositions of the invention do not hydrate. However, minor amounts of hydratable calcium silicate phases (e.g., C2S, C3S and CaO) may be present. C2S exhibits slow kinetics of hydration when exposed to water and is quickly converted to $CaCO_3$ during $CO_2$ curing processes. C3S and CaO hydrate quickly upon exposure to water and thus should be limited to <5% by mass.

It should be understood that, calcium silicate compositions, phases and methods disclosed herein can be adopted to use magnesium silicate phases in place of or in addition to calcium silicate phases. As used herein, the term "magnesium silicate" refers to naturally-occurring minerals or synthetic materials that are comprised of one or more of a groups of magnesium-silicon-containing compounds including, for example, $Mg_2SiO_4$ (also known as "forsterite") and $Mg_3Si_4O_{10}(OH)_2$ (also known as "talc") and $CaMgSiO_4$ (also known as "monticellite"), each of which material may include one or more other metal ions and oxides (e.g., calcium, aluminum, iron or manganese oxides), or blends thereof, or may include an amount of calcium silicate in naturally-occurring or synthetic form(s) ranging from trace amount (1%) to about 50% or more by weight.

A major utility of the carbonatable composition is that it can be carbonated to form lightweight composite materials that are useful in a variety of application. The carbonation, for example, may be carried out reacting it with $CO_2$ via a controlled Hydrothermal Liquid Phase Sintering (HLPS) process to create bonding elements that hold together the various components of the composite material. For example in preferred embodiments, $CO_2$ is used as a reactive species resulting in sequestration of $CO_2$ and the creation of bonding elements in the produced composite materials with in a carbon footprint unmatched by any existing production technology. The HLPS process is thermodynamically driven by the free energy of the chemical reaction(s) and reduction of surface energy (area) caused by crystal growth. The kinetics of the HLPS process proceed at a reasonable rate at low temperature because a solution (aqueous or nonaqueous) is used to transport reactive species instead of using a high melting point fluid or high temperature solid-state medium.

Discussions of various features of HLPS carbonatable calcium silicate-based cements, carbonation and formation of bonding elements, apparatus and processes thereof, carbonatable calcium silicate-based cements, carbonation and formation of bonding elements, apparatus and processes thereof, and related topics can be found in U.S. Pat. No. 8,114,367, U.S. Pub. No. US 2009/0143211 (application Ser. No. 12/271,566), U.S. Pub. No. US 2011/0104469 (application Ser. No. 12/984,299), U.S. Pub. No. 2009/0142578 (application Ser. No. 12/271,513), U.S. Pub. No. 2013/0122267 (application Ser. No. 13/411,218), U.S. Pub. No. 2012/0312194 (application Ser. No. 13/491,098), WO 2009/102360 (PCT/US2008/083606), WO 2011/053598 (PCT/US2010/054146), WO 2011/090967 (PCT/US2011/021623), U.S. Provisional Patent Application No. 61/708,423 filed Oct. 1, 2012, and U.S. Pub. No. 2014/0127450 (application Ser. No. 14/045,758), U.S. Pub. No. 2015/0266778 (application Ser. No. 14/045,519), U.S. Pub. No. 2014/0127458 (application Ser. No. 14/045,766), U.S. Pub. No. 2014/0342124 (application Ser. No. 14/045,540), U.S. Pub. No. 2014/0272216 (application Ser. No. 14/207,413), U.S. Pub. No. 2014/0263683 (application Ser. No. 14/207,421), U.S. Pat. Publ. No. 2014/0314990 (application Ser. No. 14/207,920), U.S. Pat. No. 9,221,027 (application Ser. No. 14/209,238), U.S. Pub. No. 2014/0363665 (application Ser. No. 14/295,601), U.S. Pub. No. 2014/0361471 (application Ser. No. 14/295,402), U.S. Pub. No. 2016/0355439 (application Ser. No. 14/506,079), U.S. Pub. No. 2015/0225295 (application Ser. No. 14/602,313), U.S. Pub. No. 2015/0056437 (application Ser. No. 14/463,901), U.S. Pub. No. 2016/0168720 (application Ser. No. 14/584,249), U.S. Pub. No. 2015/0336852 (application Ser. No. 14/818,629), U.S. Pub. No. 2016/0031757 (application Ser. No. 14/817,193), U.S. Pub. No. 2016/0272544 (application Ser. No. 15/074,659), U.S. Pub. No. 2016/0096773 (application Ser. No. 14/874,350), U.S. Pub. No. 2016/0340261 (application Ser. No. 14/715,497), U.S. Pub. No. 2016/0272545 (application Ser. No. 15/074,692), U.S. Pub. No. 2017/0102373 (application Ser. No. 15/290,328), U.S. Pub. No. 2017/0121223 (application Ser. No. 15/335,520), U.S. Pub. No. 2017/0204010 (application Ser. No. 15/409,352), U.S. Pub. No. 2017/0253530 (application Ser. No. 15/449,736), U.S. Pub. No. 2017/0260096 (application Ser. No. 15/451,344), U.S. Pub. No. 2017/0320781 (application Ser. No. 15/587,705), U.S. Pub. No. US 2017/0341989 (application Ser. No. 15/609,908), U.S. application Ser. No. 15/716,392, filed Sep. 26, 2017, U.S. application Ser. No. 15/831,135, filed Dec. 4, 2017, each of which is expressly incorporated herein by reference in its entirety for all purposes.

In exemplary embodiments of carbonation of the calcium silicate composition of the invention, ground calcium silicate particles is used. The ground calcium silicate particles may have a mean particle size from about 1 μm to about 100 μm (e.g., about 1 μm to about 80 μm, about 1 μm to about 60 μm, about 1 μm to about 50 μm, about 1 μm to about 40 μm, about 1 μm to about 30 μm, about 1 μm to about 20 μm, about 1 μm to about 10 μm, about 5 μm to about 90 μm, about 5 μm to about 80 μm, about 5 μm to about 70 μm, about 5 μm to about 60 μm, about 5 μm to about 50 μm, about 5 μm to about 40 μm, about 10 μm to about 80 μm, about 10 μm to about 70 μm, about 10 μm to about 60 μm, about 10 μm to about 50 μm, about 10 μm to about 40 μm, about 10 μm to about 30 μm, about 10 μm to about 20 μm, about 1 μm, 10 μm, 15 μm, 20 μm, 25 μm, 30 μm, 40 μm, 50 μm, 60 μm, 70 μm, 80 μm, 90 μm, 100 μm), a bulk density from about 0.5 g/mL to about 3.5 g/mL (loose, e.g., 0.5 g/mL, 1.0 g/mL, 1.5 g/mL, 2.0 g/mL, 2.5 g/mL, 2.8 g/mL, 3.0 g/mL, 3.5 g/mL) and about 1.0 g/mL to about 1.2 g/mL (tapped), a Blaine surface area from about 150 m$^2$/kg to about 700 m$^2$/kg (e.g., 150 m$^2$/kg, 200 m$^2$/kg, 250 m$^2$/kg, 300 m$^2$/kg, 350 m$^2$/kg, 400 m$^2$/kg, 450 m$^2$/kg, 500 m$^2$/kg, 550 m2/kg, 600 m2/kg, 650 m2/kg, 700 m2/kg). In exemplary embodiments of carbonation of the calcium silicate composition of the invention, ground calcium silicate particles used have a particle size having a cumulative 10% diameter greater than 1 μm in the volume distribution of the particle size distribution.

A variety of aerated composite products can be produced using the process disclosed herein. The production methods are much improved over conventional lightweight concretes in terms of both economics and environmental impact.

If one introduces $CO_2(g)$ to a water-based solution which contains aqueous acetate ions and if the same solution contains some $Ca^{2+}$ ions in it, the below carbonation reaction will result in the formation of solid $CaCO_3$ (Eq. 1).

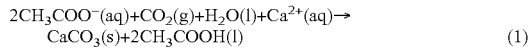
$$2CH_3COO^-(aq)+CO_2(g)+H_2O(l)+Ca^{2+}(aq) \rightarrow CaCO_3(s)+2CH_3COOH(l) \quad (1)$$

The interesting feature of this reaction was its ability to in situ (via carbonation) generating acetic acid ($CH_3COOH$), which could then be exploited to further leach $Ca^{2+}$ from unreacted Ca-silicate particles within the carbonation chamber, according to the below reaction (Eq. 2).

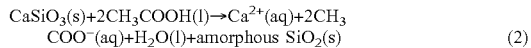
$$CaSiO_3(s)+2CH_3COOH(l) \rightarrow Ca^{2+}(aq)+2CH_3COO^-(aq)+H_2O(l)+\text{amorphous } SiO_2(s) \quad (2)$$

Instead of using Ca-acetate as the water soluble salt, using Mg-acetate (i.e., $Mg(CH_3COO)_2 \cdot 4H_2O$) simultaneously provides two things:

(a) acting as the source of $Mg^{2+}$ for the promotion of aragonite and/or dolomite formation during gaseous carbonation, and (b) in situ generation of acetic acid (Eq. 1) in the carbonation (i.e., $CO_2$-curing) chamber, followed by the use of that to extract more $Ca^{2+}$ ions from the unreacted ground calcium silicate particles (Eq. 2).

The dilute acetic acid solution containing dissolved MgO powder is prepared as follows. 160 g of reactive MgO powder with a mean particle size smaller than ten microns was slowly added into 1755 g of stirred solution of 50% acetic acid. MgO powder is added in small portions and the above solution is stirred at room temperature. The dissolution of MgO in acetic acid is a mildly exothermic reaction. At the end of the MgO addition, the resultant magnesium acetate solution is transparent and has a dark orange color.

The addition of a small amount of water soluble salt of magnesium acetate ($Mg(CH_3COO)_2 \cdot 4H_2O$) or a solution, i.e., the solution described in the preceding paragraph, of controlled pH value formed by dissolving a prescribed quantity of MgO powder in a prescribed volume of dilute acetic acid into the forming water of slurry, paste, mortar or concrete samples result in a noticeable strength increase upon carbonation.

The slurry comprises mixing the following ingredients in the specified percentages: the ground calcium silicate particles in about 15 wt % to about 95 wt % of the wet mixture; the magnesium oxide in about 0 wt % to about 10 wt % of the total solids; the calcium oxide in about 1 wt % to about 10 wt % of total solids; sugar in about 0.01 wt % to about 0.08 wt % of the total solids; the dispersant/superplasticizer in about 0.02 wt % to about 1.0 wt % of the total solids; ordinary Portland cement in about 0.1 wt % to about 35 wt % of total solids; calcium nitrate and/or magnesium nitrate in about 0.001 wt % to 0.5 wt % of total solids, calcium sulphate and/or magnesium sulphate in about 0.001 wt % to about 1 wt % of total solids; dilute acetic acid in about 0.02 wt % to 5 wt % of total solids; and the $H_2$ gas-generating agent in about 0.05 wt % to about 0.5 wt % of total solids.

EXAMPLES

This working examples uses Solidia-PECS cement (abbreviated as Pecs) to produce aerated samples with the final, $CO_2$-cured dimensions of 25×15×15 cm or 45×25×15 cm or 45×25×30 cm or 70×60×65 cm. CaO (quicklime) is used as an additive. The superplasticizer/dispersant used is BASF Glenium-7500, which is abbreviated as G. The surfactant used is an alkali soap-based surfactant, abbreviated as S. Ordinary or rapid-setting Portland cements also used in some cases as an additive, over the weight percent range of 0.5 to 25% (of solids in the slurry), and it is usually abbreviated as OPC or RSPC. MgO used was a submicron, highly reactive powder. MgO with mean particle sizes of 10 and 50 microns were also used in the Solidia aerated slurry preparations. Mg-acetate tetrahydrate is a water-soluble magnesium salt and was used in some cases, which is abbreviated as Mg—Ac. As an alternative to using magnesium acetate tetrahydrate as an additive, acetate and magnesium ions were brought into the slurries in the form of a transparent, orange-colored solution of MgO and dilute acetic acid, which was prepared before the slurry preparation stage. Calcium nitrate tetrahydrate, calcium sulphate, magnesium nitrate, and/or magnesium sulphate, at the ppm levels, were used for the purpose of controlling the foam rise and foam stability.

Example 1

A water based slurry is prepared by using 92.5 wt % (of solids) Pecs and 7.5% CaO (of solids), together with 0.13% (of solids) Al powder, 15% (of the amount of Al added) surfactant, the cast slurry is able to form a foam by itself. These slurries can be prepared by using W/S ratios with or without using a superplasticizer/dispersant, with W/S ratios varying from 0.35 to 0.70 or higher. $CO_2$-cured aerated samples of this example, when analyzed by X-ray diffraction (XRD), exhibited calcite as the main carbonation phase, with no aragonite. Such samples reached compressive strengths from about 0.2 to 1.9 MPa, over the density range of 450 to 540 kg/m$^3$.

Example 2

A water based slurry was prepared by using 1.67 wt % (of solids) magnesium acetate tetrahydrate, 90.83 wt % (of solids) Pecs and 7.5% CaO (of solids), together with 0.143% (of solids) Al powder, 20% (of the amount of Al added) surfactant, the cast slurry was able to form a foam by itself. These slurries can be prepared by using W/S ratios with or without using a superplasticizer/dispersant, with W/S ratios varying from 0.4 to 0.60 or higher. $CO_2$-cured aerated samples of this example, when analyzed by X-ray diffraction (XRD), exhibited aragonite whiskers or needles as the primary phase of carbonation, whereas calcite was the secondary carbonation phase. Such samples reached compressive strengths from about 1.6 to 3.1 MPa, over the density range of 480 to 490 kg/m$^3$.

Example 3

A water based slurry was prepared by using 10 wt % (of solids) submicron, high reactivity magnesium oxide, 86 wt % (of solids) Pecs and 4% CaO (of solids), together with 0.143% (of solids) Al powder, 20% (of the amount of Al added) surfactant, the cast slurry was able to form a foam by itself. These slurries can be prepared by using W/S ratios with or without using a superplasticizer/dispersant, with W/S ratios varying from 0.4 to 0.60 or higher. $CO_2$-cured aerated samples of this example, when analyzed by X-ray diffraction (XRD), exhibited aragonite and dolomite as the primary phases of carbonation, whereas calcite was the secondary carbonation phase. Such samples reached compressive strengths from about 2.5 MPa, at the density of 460±4 kg/m$^3$.

Example 4

A water based slurry was prepared by using 7.5 wt % (of solids) submicron, high reactivity magnesium oxide, 91.3 wt % (of solids) Pecs, 1.2 wt % (of solids) magnesium acetate tetrahydrate, together with 0.135% (of solids) Al powder, 18% (of the amount of Al added) surfactant, the cast slurry is able to form a foam by itself. These slurries can be prepared by using W/S ratios with or without using a superplasticizer/dispersant, with W/S ratios varying from 0.4 to 0.60 or higher. $CO_2$-cured aerated samples of this example, when analyzed by X-ray diffraction (XRD), exhibited aragonite and dolomite as the primary phases of carbonation, whereas calcite was the secondary carbonation phase. Such samples reached compressive strengths from about 3.65 MPa, at the density of 520±10 kg/m$^3$.

Example 5

A water based slurry was prepared by using 7.5 wt % (of solids) calcium oxide, 90.83 wt % (of solids) Pecs, 1.67 wt % (of solids) magnesium acetate tetrahydrate, together with 0.13% (of solids) Al powder, 20% (of the amount of Al added) surfactant, the cast slurry was able to form a foam by itself. These slurries can be prepared by using W/S ratios with or without using a superplasticizer/dispersant, with W/S ratios varying from 0.4 to 0.60 or higher. $CO_2$-cured aerated samples of this example, when analyzed by X-ray diffraction (XRD), exhibited aragonite whiskers as the primary phases of carbonation, whereas calcite was the secondary carbonation phase. Such samples reached compressive strengths from about 3.6 MPa, at the density of 540±5 kg/m$^3$.

Example 6

A water based slurry was prepared by using 7.5 wt % (of solids) calcium oxide, 1 wt % (of solids) submicron, high reactivity magnesium oxide, 90.3 wt % (of solids) Pecs, 1.2 wt % (of solids) magnesium acetate tetrahydrate, together with 0.143% (of solids) Al powder, 20% (of the amount of Al added) surfactant, the cast slurry was able to form a foam by itself. These slurries can be prepared by using W/S ratios by using a superplasticizer/dispersant, with W/S ratios varying from 0.38 to 0.40. $CO_2$-cured aerated samples of this example, when analyzed by X-ray diffraction (XRD), exhibited aragonite whiskers as the primary phases of carbonation, whereas calcite was the secondary carbonation phase. Such samples reached compressive strengths from about 4.7 MPa, at the density of 530±5 kg/m$^3$.

Example 7

A water based slurry was prepared by using 7.5 wt % (of solids) calcium oxide, 2 wt % (of solids) OPC (Type I), 0.6 wt % (of solids) submicron, high reactivity magnesium oxide, 88.3 wt % (of solids) Pecs, 1.6 wt % (of solids) magnesium oxide-acetic acid solution (orange-colored), together with 0.10% (of solids) Al powder, 20% (of the amount of Al added) surfactant, the cast slurry is able to form a foam by itself. These slurries can be prepared by using W/S ratios by using a superplasticizer/dispersant, with W/S ratios varying from 0.34 to 0.35. $CO_2$-cured aerated samples of this example, when analyzed by X-ray diffraction (XRD), exhibited aragonite whiskers as the primary phases of carbonation, whereas calcite was the secondary carbonation phase. Such samples reached compressive strengths from about 4.5 to 5.3 MPa, at the density of 550±10 kg/m$^3$.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples disclosed herein are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. The following examples contain important additional information, exemplification and guidance that can be adapted to the practice of this invention in its various embodiments and equivalents thereof.

What is claimed is:

1. A process of production of an aerated composite material, comprising:
    forming a wet mixture or slurry, wherein the wet mixture or slurry comprises water,
        filler particles comprising CaO having a particle size of 0.1 µm to 1000 µm,
        ground calcium silicate particles,
        one or more minerals comprising a magnesium acetate salt, an aqueous solution of magnesium oxide and acetic acid, and/or submicron magnesium oxide powder, and
        an aerating agent,
        wherein, the wet mixture or slurry has a water/solid ratio (W/S) of 0.6 to 1.0;
        wherein the one or more minerals accounts for about 0.02% to about 20% by weight of the ground calcium silicate particles;
    casting the wet mixture or slurry in a mold;
    allowing the aerating agent to generate hydrogen gas thereby causing volume expansion of the slurry;
    pre-curing the obtained expanded mixture to a hardness enabling it to be taken out of the mold and moved;
    curing the pre-cured expanded mixture at 30° C. or more of temperature, a relative humidity of 1% or more, and an atmosphere of a $CO_2$ gas concentration of 10 to 95% for 6 hours to 60 hours to produce a cured aerated material.

2. The process according to claim 1, wherein the obtained pre-cured expanded mixture is cut into a desired product shape prior to curing.

3. The process according to claim 2, wherein the cutting of the pre-cured expanded mixture is carried out using a piano wire, diamond wire, or cutting saw.

4. The process according to claim 1, wherein magnesium oxide in the one or more minerals accounts for about 1% to about 20% by weight of the ground calcium silicate particles.

5. The process according to claim 1, wherein the ground calcium silicate particles comprise one or more of a group of calcium silicate phases selected from CS (wollastonite or pseudowollastonite), C3S2 (rankinite), C2S (belite, larnite, bredigite), an amorphous calcium silicate phase, each of which material optionally comprises one or more metal ions or oxides, or blends thereof.

6. The process according to claim 1, wherein in the ground calcium silicate particles elemental Ca and elemental Si are present in a molar ratio from about 0.5 to about 1.5 and metal oxides of Al, Fe and Mg are present in the composition at about 30% or less by mass.

7. The process according to claim 1, wherein the temperature at the curing step is in a range from about 30° C. to about 90° C.

8. The process according to claim 7, wherein the temperature at the curing step is in a range from about 60° C. to about 85° C.

9. The process according to claim 1, wherein the relative humidity at the curing step is 10% or more.

10. The process according to claim 1, wherein the time at the curing step is 6 hours or more.

11. The process according to claim 1, wherein the cured aerated material contains the phases of aragonite and/or dolomite together with calcite.

12. The process according to claim 11, wherein the one or more minerals comprises the magnesium acetate salt.

13. The process according to claim 1, wherein the wet mixture or slurry further comprises a dispersant or superplasticizer.

14. The process according to claim 13, wherein the dispersant or superplasticizer comprises a polycarboxylate-based polymer.

* * * * *